3,025,295
2-(ARALKYLTHIO)TETRAHYDROPYRIMIDINES AND DERIVATIVES THEREOF

Robert C. Tweit, Wilmette, Ill., assignor to G. D. Searle & Co., Chicago, Ill., a corporation of Delaware
No Drawing. Filed June 19, 1959, Ser. No. 821,384
7 Claims. (Cl. 260—251)

The present invention relates to novel derivatives of heterocyclic mercaptans and more particularly to 2-(aralkylthio)tetrahydropyrimidines, which can be represented by the structural formula

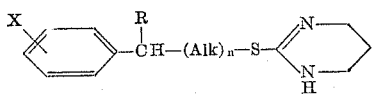

wherein R is selected from the group consisting of hydrogen and phenyl radicals; X is selected from the group consisting of hydrogen, halogen atoms having an atomic weight of less than 100, and nitro radicals; Alk is a lower alkylene radical containing fewer than 5 carbon atoms; and $n$ is selected from the group consisting of the numbers 0 and 1. Lower alkylene radicals as represented by Alk are, for example:

$$-CH_2- \text{ (methylene)}$$
$$-CH_2CH_2- \text{ (ethylene)}$$
$$-CH_2CH_2CH_2- \text{ (trimethylene)}$$
$$-CH_2CH_2CH_2CH_2- \text{ (tetramethylene)}$$
$$-CH_3\overset{CH_3}{\underset{|}{C}}H- \text{ (1,2-propylene)}$$
$$-CH_2\overset{CH_3}{\underset{|}{C}}HCH_2- \text{ (2-methyl-1,3-propylene)}$$
$$-\overset{CH_3}{\underset{|}{C}}H- \text{ (methylmethylene)}$$

The compounds of this invention can be manufactured by the reaction of trimethylene thiourea with the appropriate halogenated compound in a suitable polar organic solvent. This reaction apparently proceeds through the sulfhydryl tautomeric form of the sulfur-containing component, as shown below:

As is demonstrated by the above representation, the products are first obtained in the form of their hydrohalogen salts. By procedures which are well known to those persons skilled in the art, the latter salts can be converted to the corresponding free bases. As a specific example of the instant process, trimethylene thiourea is treated with ortho-chlorobenzyl chloride in ethanol solution to afford 2-(ortho-chlorobenzylthio)tetrahydropyrimidine hydrochloride. Reaction of this salt with an inorganic alkali such as sodium carbonate in aqueous solution results in the corresponding free base.

The compounds of this invention are useful as a result of their valuable pharmacological properties. They are, for example, anti-spasmodic agents in consequence of their ability to decrease the barium chloride-induced spastic contractions of smooth muscle. They are diuretic agents also as a result of their ability to increase water excretion. In addition, they have hormonal and anti-hormonal properties as typified by their ability to inhibit the hyperemia and edema associated with inflammatory states and their ability to inhibit the susceptibility to Coxsackie virus infection produced by cortisone administration.

The invention will appear more fully from the examples which follow. These examples are set forth by way of illustration only and it will be understood that the invention is not to be construed as limited in spirit or in scope by the details contained therein, as many modifications in materials and methods will be apparent from this disclosure to those skilled in the art. In these examples temperatures are given in degrees centigrade (° C.). Quantities of materials are expressed in parts by weight except where otherwise noted.

Example 1

A mixture of 5.8 parts of trimethylene thiourea, 6 parts of benzyl chloride, and 10 parts of ethanol is heated on the steam bath for about 30 minutes, then concentrated to about one-half volume and cooled. The crystals which separate are collected by filtration and dried to afford 2-benzylthiotetrahydropyrimidine hydrochloride, M.P. 167–168°.

By substituting an equivalent quantity of phenethyl chloride and otherwise proceeding according to the herein described process, 2-phenethylthiotetrahydropyrimidine hydrochloride is obtained.

Example 2

A mixture of 5.8 parts of trimethylene thiourea, 7.7 parts of o-chlorobenzyl chloride and 10 parts of ethanol is heated on the steam bath for one hour. Dilution of the mixture with benzene results in crystallization of the product, which is removed by filtration and dried to yield 2-(o-chlorobenzylthio)tetrahydropyrimidine hydrochloride, M.P. 192–196°.

Example 3

Substitution of an equivalent quantity of p-chlorobenzyl chloride in the process of Example 2 results in 2-(p-chlorobenzylthio)tetrahydropyrimidine hydrochloride, M.P. 160–164°.

Example 4

A mixture of 5.8 parts of trimethylene thiourea, 8.6 parts of p-nitrobenzyl chloride and 10 parts of ethanol is heated on the steam bath for about one hour. The product begins to crystallize during the heating period and is isolated by filtration of the cooled reaction mixture. Drying of these crystals affords pure 2-(p-nitrobenzylthio)tetrahydropyrimidine hydrochloride, M.P. 241–243°.

Example 5

A mixture of 5.8 parts of trimethylene thiourea, 10.1 parts of benzohydryl chloride, and 10 parts of ethanol is heated on the steam bath for about one hour. The reaction mixture is cooled and the crystalline product collected by filtration. Recrystallization from acetone-methanol affords 2-benzohydrylthiotetrahydropyrimidine hydrochloride, M.P. 173–177°.

By substituting an equivalent quantity of 2,2-diphenylethyl chloride and otherwise proceeding according to the herein described processes, 2-(2,2-diphenylethylthio)-tetrahydropyrimidine hydrochloride is obtained.

Example 6

A mixture of 5.8 parts of trimethylene thiourea, 13.2 parts of 2-(p-bromophenyl)ethyl bromide and 10 parts of ethanol is heated on the steam bath for about one hour, then concentrated to about one-half volume. The crystals which separate upon cooling are collected by filtration, resulting in 2-[2-(p-bromophenyl)ethylthio]tetrahydropyrimidine hydrobromide.

By substituting an equivalent quantity of 4-(o-nitrophenyl)n-butyl chloride and otherwise proceeding according to the herein described processes, 2-[4-(o-nitrophenyl)n-butylthio]tetrahydroppyrimidine hydrochloride is obtained.

*Example 7*

A solution of 5 parts of 2-benzylthiotetrahydropyrimidine hydrochloride in 100 parts of water is made alkaline with the cautious addition of solid sodium carbonate. The mixture is extracted with ether and the organic layer separated, washed with water, dried over anhydrous sodium sulfate, and concentrated to dryness in vacuo to afford the oily free base, 2-benzylthiotetrahydropyrimidine.

Substitution of an equivalent quantity of 2-(o-chlorobenzylthio)tetrahydropyrimidine hydrochloride in the instant process results in the corresponding free base, 2-(o-chlorobenzylthio)tetrahydropyrimidine.

What is claimed is:
1. A compound of the structural formula

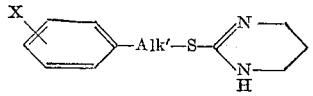

where X is a halogen atom having an atomic weight less than 100, and Alk' is a lower alkylene radical.

2. A compound of the structural formula

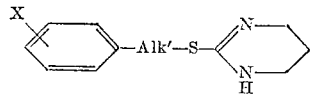

wherein X is a nitro group and Alk' is a lower alkylene radical.

3. 2-(o-chlorobenzylthio)tetrahydropyrimidine.
4. 2-(p-chlorobenzylthio)tetrahydropyrimidine.
5. 2-(p-nitrobenzylthio)tetrahydropyrimidine.
6. 2-benzohydrylthiotetrahydropyrimidine.
7. A compound of the structural formula

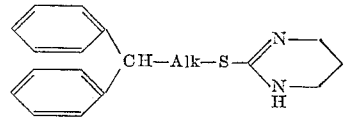

wherein Alk is a lower alkylene radical.

References Cited in the file of this patent
UNITED STATES PATENTS
2,876,223    Bloom _____ Mar. 3, 1959
FOREIGN PATENTS
758,827    Great Britain _____ Oct. 10, 1959